US010800453B2

(12) United States Patent
Yamazaki et al.

(10) Patent No.: US 10,800,453 B2
(45) Date of Patent: Oct. 13, 2020

(54) WHEEL STEERING SYSTEM

(71) Applicant: HONDA MOTOR CO., LTD., Tokyo (JP)

(72) Inventors: Ryosuke Yamazaki, Wako (JP); Takumi Inagaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 16/199,623

(22) Filed: Nov. 26, 2018

(65) Prior Publication Data

US 2019/0161115 A1    May 30, 2019

(30) Foreign Application Priority Data

Nov. 27, 2017  (JP) .................................. 2017-226663

(51) Int. Cl.
*B62D 7/18*    (2006.01)
*B60G 21/05*   (2006.01)
(Continued)

(52) U.S. Cl.
CPC ............. *B62D 7/18* (2013.01); *B60G 21/051* (2013.01); *B62D 7/20* (2013.01); *B62D 17/00* (2013.01);
(Continued)

(58) Field of Classification Search
CPC . B62D 7/18; B62D 7/20; B62D 17/00; B62D 7/166; B60G 21/051;
(Continued)

(56) References Cited

U.S. PATENT DOCUMENTS 4,740,012 A * 4/1988 Kondo .................. B60G 3/205
                                                      280/124.144
4,836,577 A   6/1989 Abe et al.
(Continued)

FOREIGN PATENT DOCUMENTS

JP    S62-11073 U    1/1987
JP    S63-162313 A   7/1988
(Continued)

OTHER PUBLICATIONS

Japanese Office Action with English Translation dated Jul. 2, 2019 (8pages).

*Primary Examiner* — Paul N Dickson
*Assistant Examiner* — Kurtis Nielson
(74) *Attorney, Agent, or Firm* — Rankin, Hill & Clark LLP

(57) ABSTRACT

A wheel steering system includes: a rear suspension mechanism inclusive of a knuckle member for rotatably holding a right rear wheel; a first cam and a second cam that are rotatably supported; a first cam follower 18 that follows the first cam; a second cam follower 20 that follows the second cam 16; cam grooves 48 respectively provided in the first and second cams; a first engaging pin and a second engaging pin that engage with the respective cam grooves; and a rotational driving force transmitter that transmits a rotational driving force of an electric motor to the first and second cams, wherein the first cam and the first cam follower are arranged on a front side in the vehicle front-rear direction of an axle, and the second cam and the second cam follower are arranged on a rear side in the vehicle front-rear direction of the axle.

8 Claims, 9 Drawing Sheets

(51) Int. Cl.
*B62D 17/00* (2006.01)
*B62D 7/20* (2006.01)
*B62D 7/16* (2006.01)

(52) U.S. Cl.
CPC .... *B60G 2200/422* (2013.01); *B60G 2200/44* (2013.01); *B60G 2200/462* (2013.01); *B60G 2202/42* (2013.01); *B60G 2202/442* (2013.01); *B60G 2204/42* (2013.01); *B60G 2204/62* (2013.01); *B60G 2206/20* (2013.01); *B60G 2206/50* (2013.01); *B60G 2500/40* (2013.01); *B62D 7/166* (2013.01)

(58) Field of Classification Search
CPC .......... B60G 2202/442; B60G 2204/62; B60G 2200/462; B60G 2204/42; B60G 2202/42; B60G 2500/40; B60G 2204/50; B60G 2200/44
USPC .................................................. 280/93.512
See application file for complete search history.

(56) References Cited

U.S. PATENT DOCUMENTS

| | | | | |
|---|---|---|---|---|
| 5,700,025 A * | 12/1997 | Lee | .................. | B60G 3/265 280/124.135 |
| 5,775,719 A * | 7/1998 | Holden | .................. | B60G 7/02 280/86.75 |
| 6,293,561 B1 * | 9/2001 | Goetzen | .................. | B60G 3/01 280/5.5 |
| 2004/0140642 A1 * | 7/2004 | Perello | .................. | B60G 3/01 280/124.147 |
| 2008/0100021 A1 | 5/2008 | Yamada | | |
| 2009/0194965 A1 * | 8/2009 | Boston | .................. | B60G 3/20 280/124.136 |
| 2010/0117313 A1 * | 5/2010 | Choi | .................. | B60G 7/006 280/5.523 |
| 2010/0164189 A1 * | 7/2010 | Buma | .................. | B60G 17/0161 280/5.521 |
| 2010/0289229 A1 * | 11/2010 | Post, II | .................. | B60G 17/0152 280/5.524 |
| 2011/0101637 A1 * | 5/2011 | Shibuya | .................. | B60G 3/20 280/86.758 |
| 2011/0233880 A1 * | 9/2011 | Lee | .................. | B62D 17/00 280/5.5 |
| 2012/0104713 A1 * | 5/2012 | Frens | .................. | B60G 7/003 280/86.75 |
| 2016/0167709 A1 * | 6/2016 | Pfeiffer | .................. | F16D 41/105 280/86.751 |
| 2016/0221408 A1 * | 8/2016 | Niggemeyer | .................. | B62D 17/00 |
| 2019/0367094 A1 * | 12/2019 | Seo | .................. | B62D 7/20 |

FOREIGN PATENT DOCUMENTS

| | | |
|---|---|---|
| JP | H07-61363 A | 3/1995 |
| JP | 2004-122932 A | 4/2004 |
| JP | 2007-050787 A | 3/2007 |
| JP | 2009-113796 A | 5/2009 |
| JP | 4867460 B2 | 2/2012 |
| JP | 4868129 B2 | 2/2012 |

* cited by examiner

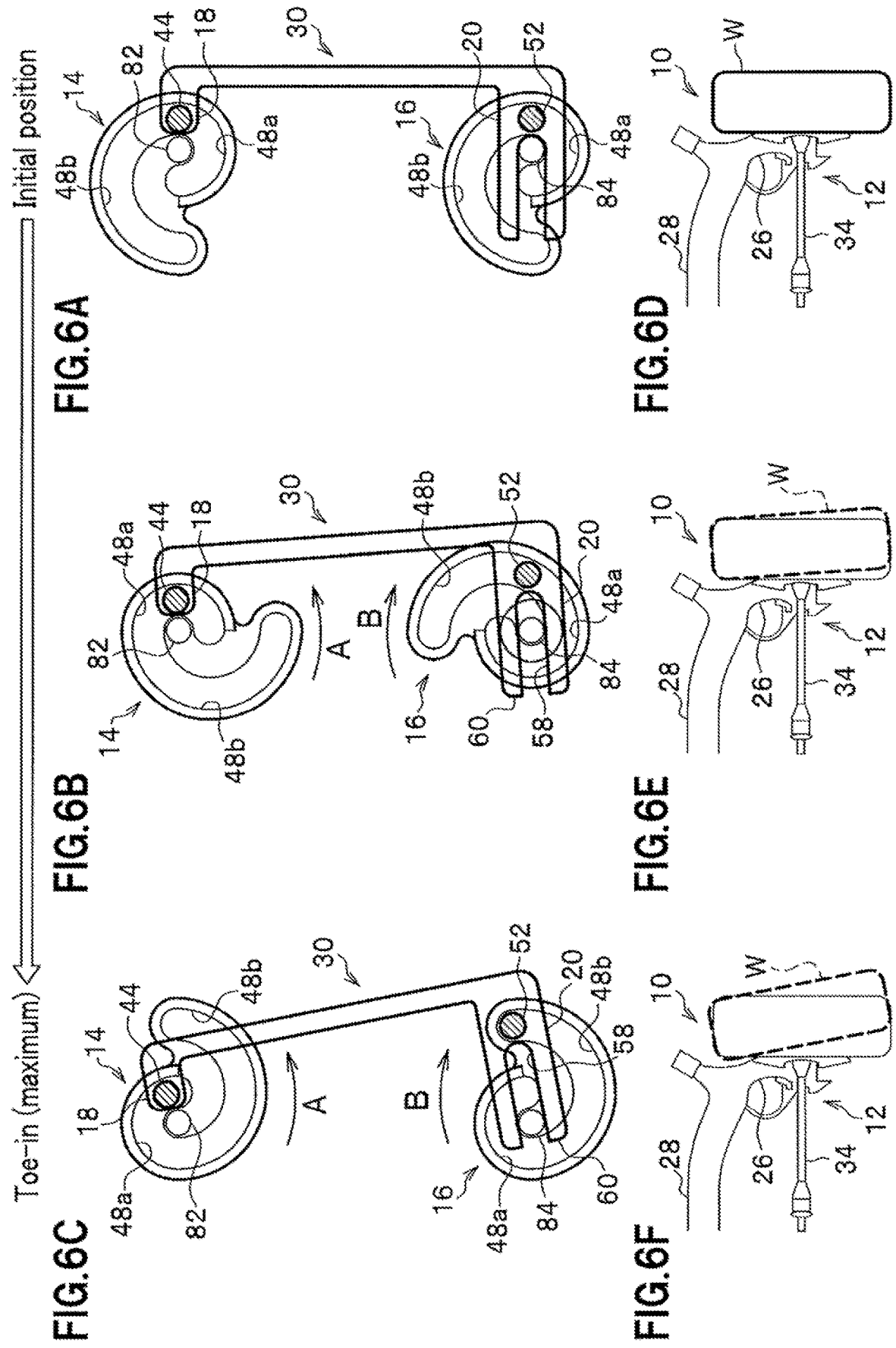

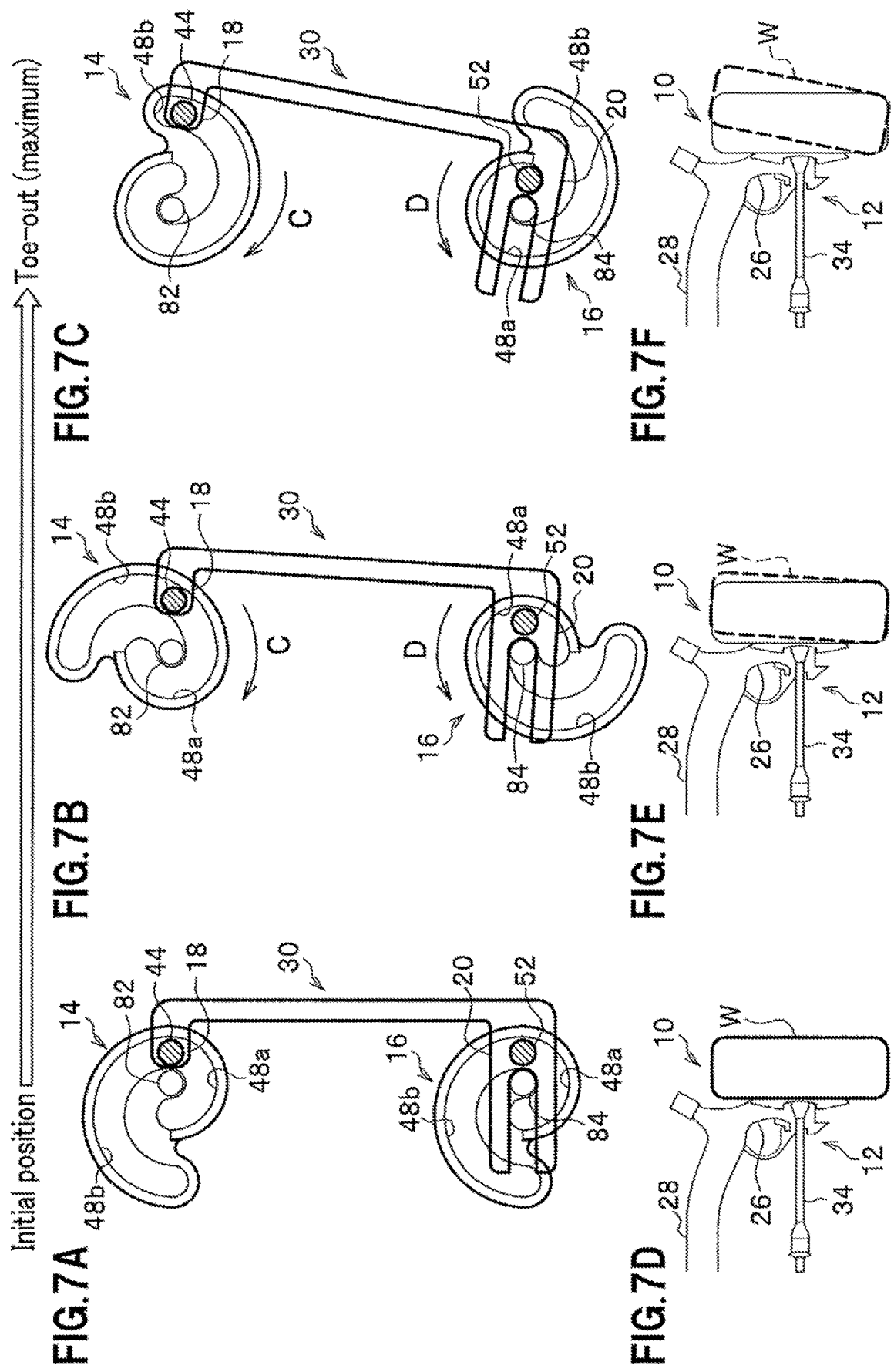

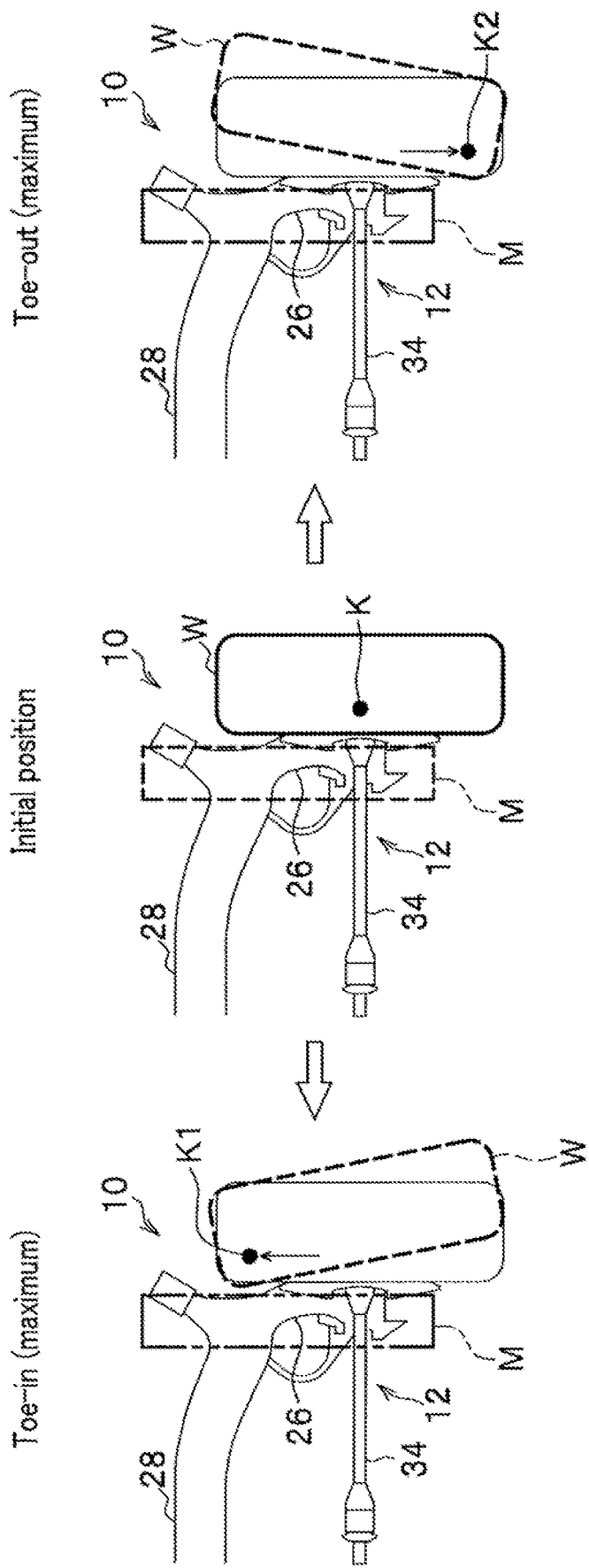

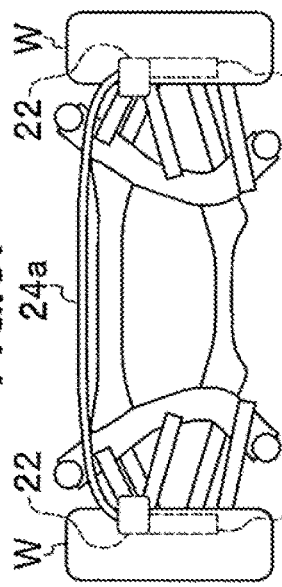
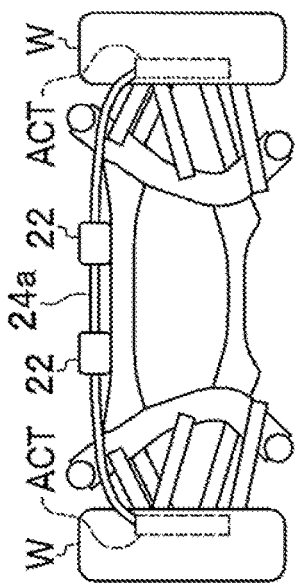
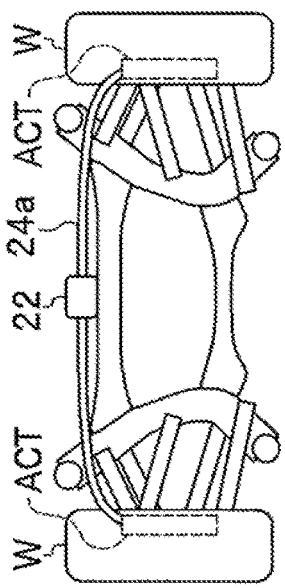
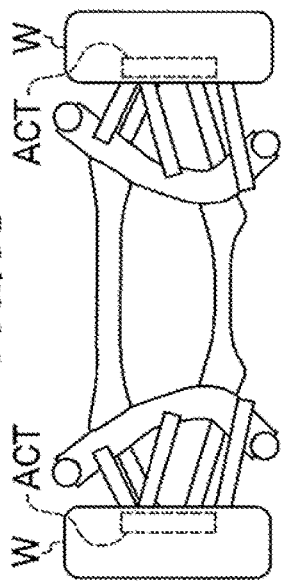
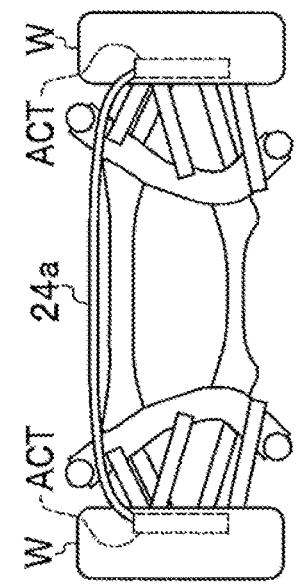
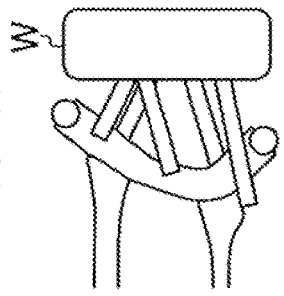
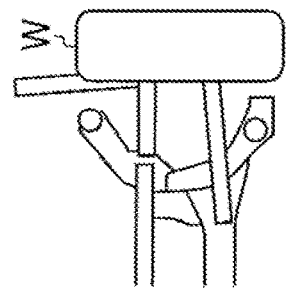
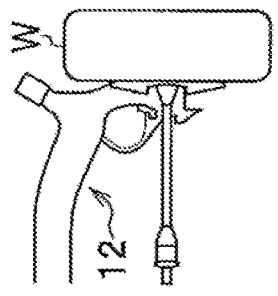

COMPARATIVE EXAMPLE

WHEEL STEERING SYSTEM

CROSS-REFERENCE TO RELATED APPLICATION

This application claims the benefit of priority to Japanese Patent Application No. 2017-226663 filed 27 Nov. 2017, the disclosures of all of which are hereby incorporated by reference in their entireties.

TECHNICAL FIELD

The present invention relates to a wheel steering system for a vehicle.

BACKGROUND OF THE INVENTION

Japanese Patent No. 4868129 B2 (hereinbelow, referred to as Patent Document 1), as an example, discloses a wheel steering system that uses two actuators, which are arranged along a vehicle traveling direction, to change a toe angle (steering angle) of a wheel.

In addition, Japanese Patent No. 4867460 B2 discloses a wheel steering system that uses an actuator including three hydraulic cylinders, which are equiangularly arranged along the circumferential direction, to change a toe angle (steering angle) of a wheel.

SUMMARY OF THE INVENTION

Problems to be Solved

Incidentally, an actuator in the prior art is complicated in structure to include many parts, so that it has likely been increased in size.

In addition, if the toe angle of the wheel is to be varied more widely, the actuator may be further increased in size to have an increased weight and this causes traveling performance to be degraded. Further, this increases manufacturing costs and causes an arm or arms for supporting the actuator also to be increased in size, so that a cabin space is reduced.

Specifically, in the case where the wheel steering system disclosed in Patent Document 1 is used to have an increased steering angle (to be steered with an increased steering angle), the two actuators themselves are increased in size. Additionally, the arms supporting the respective actuators are required to have more strength in order to support increased unsprung mass, to cause the arms to be increased in size. As described above, the actuators and the arms are increased in size in the case where the wheel steering system is to be steered with an increased steering angle, to make it difficult for those components being layed out in a conventional cabin space. As a result, a space for laying out such a suspension system needs to be secured at the expense of the cabin space.

The present invention has been made in view of the above problems, and is intended to provide a wheel steering system that has a simple structure to have less weight, to have less manufacturing costs, and to allow for increasing a cabin space.

Solution to Problem

In order to achieve the above objective, the present invention provides a wheel steering system that includes: a suspension mechanism inclusive of a knuckle for rotatably holding a wheel; a first cam and a second cam that are rotatably supported with respect to the suspension mechanism; a drive source that rotationally drives the first cam and the second cam; a first cam follower that is provided on the knuckle and is adapted to follow the first cam; a second cam follower that is provided on the knuckle and is adapted to follow the second cam; a first guide portion provided in one of the first cam and the first cam follower, and a first engagement part provided in the other of the first cam and the first cam follower to engage with the first guide portion; a second guide portion provided in one of the second cam and the second cam follower, and a second engagement part provided in the other of the second cam and the second cam follower to engage with the second guide portion; and a driving force transmitter that transmits a driving force of the drive source to the first cam and the second cam, wherein the first cam and the first cam follower are arranged on one side in a vehicle front-rear direction with respect to a wheel rotating shaft, and the second cam and the second cam follower are arranged on the other side in the vehicle front-rear direction with respect to the wheel rotating shaft.

Advantageous Effects of the Invention

The present invention provides a wheel steering system that has a simple structure to have less weight, to have less manufacturing costs, and to allow for increasing a cabin space.

BRIEF DESCRIPTION OF DRAWINGS

FIGS. 6A to 6F are diagrams of related parts being each moved from an initial position to a toe-in position, where FIGS. 6A to 6C in the upper row are schematic plan views of the positional relationship between a cam groove and an engaging pin, and FIGS. 6D To 6F in the lower row are plan views of a right rear wheel W being pivoted, as viewed from above in the vehicle up-down direction;

FIGS. 7A to 7F are diagrams of related parts being each moved from the initial position to a toe-out position, where FIGS. 7A to 7C in the upper row are schematic plan views of the positional relationship between the cam groove and the engaging pin, and FIGS. 7D To 7F in the lower row are plan views of the right rear wheel W being pivoted, as viewed from above in the vehicle up-down direction;

FIG. 8 is a plan view of the steering axis being displaced in the present embodiment when the right rear wheel is pivoted from the initial position to the toe-in or toe-out position, as viewed from above in the vehicle up-down direction;

FIGS. 9A to 9H illustrate variations of combining a suspension type, independent or non-independent control of right and left wheels, and a mounting position of an electric motor.

EMBODIMENTS OF THE INVENTION

Hereinafter, embodiments of the present invention will be described in detail with reference to the drawings as appropriate.

Figure 1:
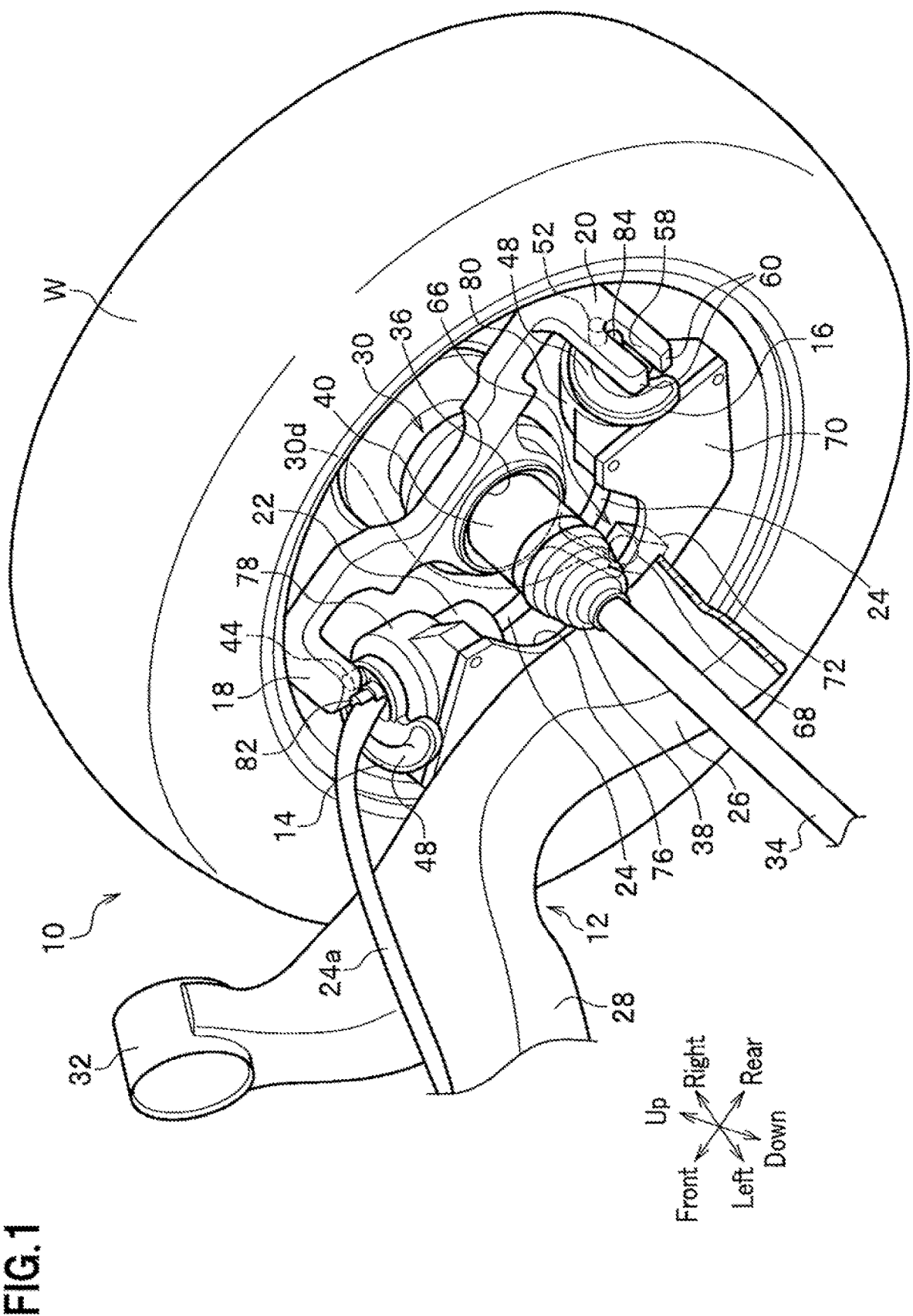
FIG. 1 is a perspective view of a right rear wheel of a vehicle, partially sheared, having a rear suspension device according to an embodiment of the present invention.
Figure 2:
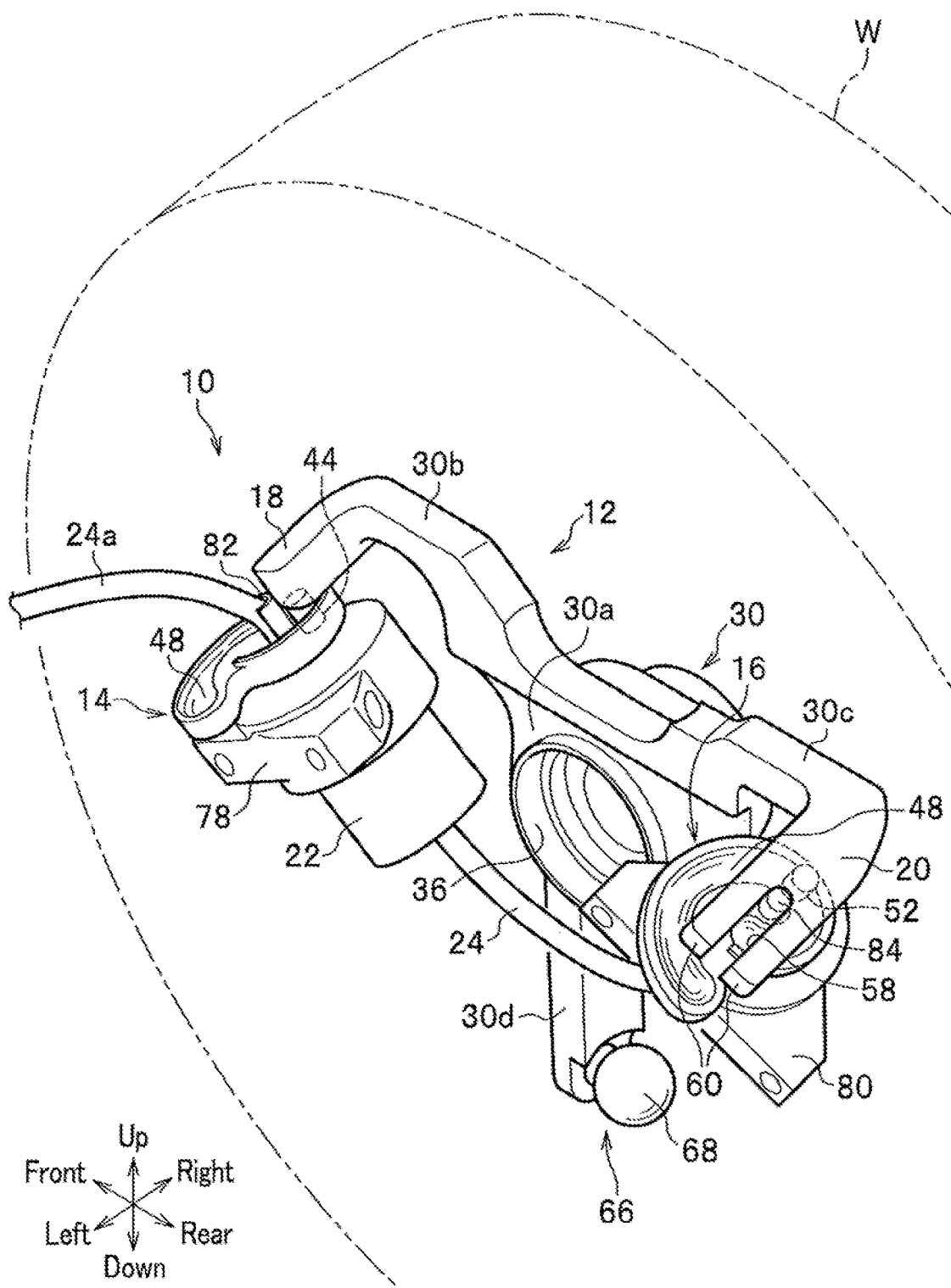
FIG. 2 is a perspective view of the rear suspension device in FIG. 1, partially unshown.
Figure 3:
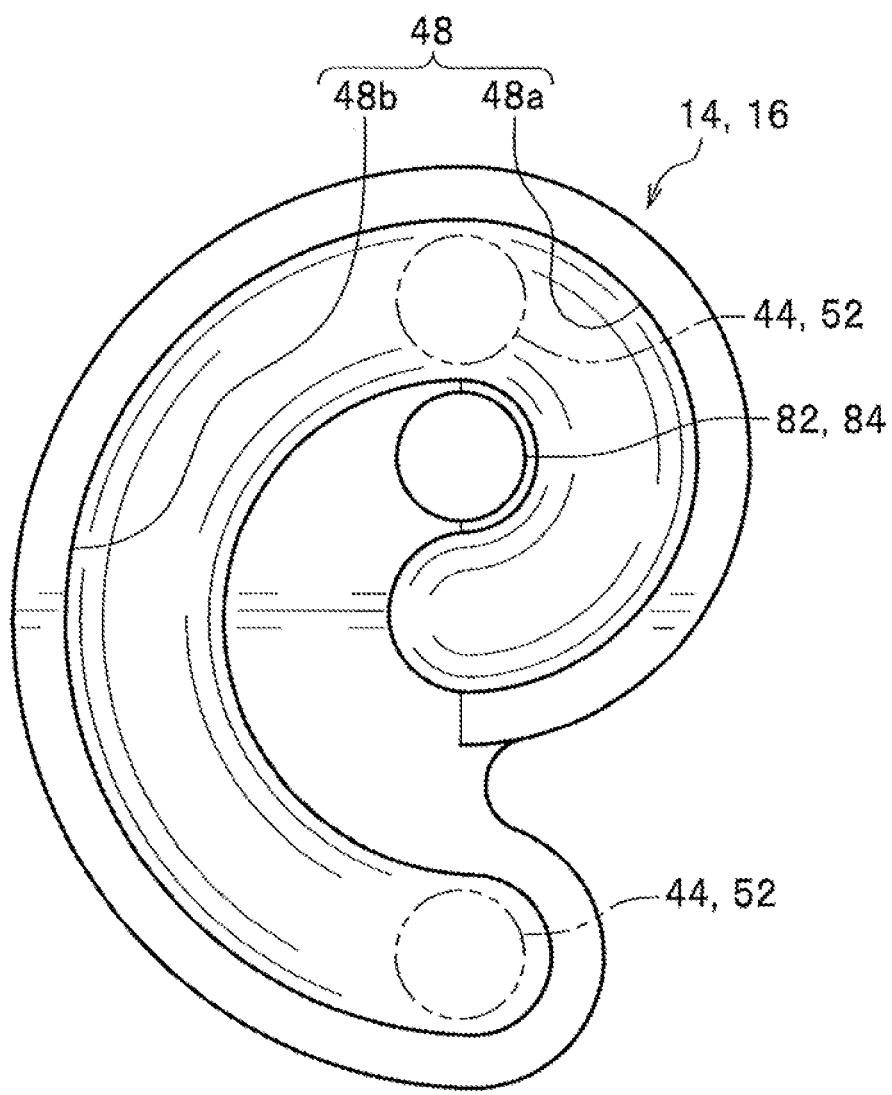
FIG. 3 is an enlarged plan view of a first cam (or second cam)

FIG. 1 is a perspective view of a right rear wheel of a vehicle, partially sheared, having a rear suspension device according to an embodiment of the present invention, FIG. 2 is a perspective view of the rear suspension device in FIG. 1, partially unshown, and FIG. 3 is an enlarged plan view of a first cam (or second cam). Note that in each figure, an arrowed line "front-rear" indicates a vehicle front-rear direction, an arrowed line "right-left" indicates a vehicle width direction (right-left direction), and an arrowed line "up-down" indicates a vehicle up-down direction (vertical vertical direction).

A rear suspension device 10 according to the embodiment of the present invention is applied to a vehicle (not shown) employing a four-wheel drive system, as an example. As shown in FIGS. 1 and 2, the rear suspension device 10 includes a rear suspension mechanism (suspension mechanism) 12, a first cam 14 and a second cam 16, a first cam follower 18 and a second cam follower 20, an electric motor (drive source) 22, and rotational driving force transmitters 24, 24a. Note that a brake mechanism and the like are not shown in FIGS. 1 and 2.

The rear suspension mechanism 12 is configured with a so-called H-type torsion beam suspension mechanism. Note that the rear suspension mechanism 12 is not limited to the H-type torsion beam suspension mechanism, and various suspension types can be adopted as will be described later (see domain A in FIG. 9).

The rear suspension mechanism 12 includes a trailing arm 26, a torsion beam 28, a knuckle member (knuckle) 30, and a rubber bushing (not shown).

The trailing arms 26 are arranged on right and left sides in the vehicle width direction, and extends along the vehicle front-rear direction. The torsion beam 28 extending along the vehicle width direction is integrally coupled with the right and left trailing arms 26 (the left trailing arm 26 is not shown in FIG. 1) at middle portions on their inner sides in the vehicle width direction. The right and left trailing arms 26 and the torsion beam 28 form an H-shape in a plan view. Note that only parts associated with the right rear wheel W are shown in FIG. 1, and parts associated with a left rear wheel are not shown. The parts associated with the left rear wheel are bilaterally symmetric to the parts associated with the right rear wheel W.

An annular body 32 is coupled to a front end in the vehicle front-rear direction of the trailing arm 26. A rubber bushing (not shown) is attached to the annular body 32. The front end of the trailing arm 26 is elastically connected via this rubber bush to a member for a vehicle body (not shown). A spring receiving seat (not shown), to which a lower end of a damper spring (not shown) is attached, and a damper mounting part (not shown), to which a damper (not shown) is attached, are provided on an inner side in the vehicle width direction of the trailing arm 26 at a rear end in the vehicle front-rear direction thereof.

The knuckle member 30 includes a knuckle main body 30a having a substantially cylindrical shape and a plurality of (three) arms extending outward in the radial direction from the outer peripheral surface of the knuckle main body 30a. The knuckle main body 30a has a through-hole 36 through which an axle (wheel rotating shaft, drive shaft) 34 rotatably supporting the right rear wheel W penetrates. A joint 40 having a rubber boot 38 is mounted between the axle 34 and the right rear wheel W.

The plurality of arms are composed of a front upper arm 30b, a rear upper arm 30c, and a lower arm 30d.

The front upper arm 30b extends frontward in the vehicle front-rear direction from the knuckle main body 30a. The first cam follower 18 that is bent inward in the vehicle width direction toward the trailing arm 26 is integrally coupled to the front upper arm 30b. A first engagement pin (first engagement part) 44 protruding downward is provided at a front end of the first cam follower 18. An end of the first engagement pin 44 slidably contacts along a cam groove (first guide portion) 48 of the first cam 14, to be described later.

The rear upper arm 30c extends rearward in the vehicle front-rear direction from the knuckle main body 30a. The second cam follower 20 that is bent inward in the vehicle width direction toward the trailing arm 26 is integrally coupled to the rear upper arm 30c. A second engaging pin (second engaging part) 52 protruding downward is provided in the middle of the second cam follower 20. An end of the second engagement pin 52 slidably contacts along a cam groove (second guide portion) 48 of the second cam 16, to be described later.

A pair of guide rails 60 having a slit 58 therebetween is provided at a front end of the second cam follower 20. The slit 58 is linearly formed substantially parallel to the pair of guide rails 60. A second rotation axle 84 of the second cam 16, to be described later, is engaged with the slit 58 to guide the second engagement pin 52 and to prevent the second engagement pin 52 from derailing the cam groove 48.

The lower arm 30d extends downward in the vehicle up-down direction from the knuckle body 30a. A ball joint 66 is provided at a lower end of the lower arm 30d. The ball joint 66 includes a male joint part 68 (moved part) that is coupled to the lower arm 30d and has a spherical body, and a female joint part 72 (fixed part) that is coupled to a bracket 70, to be described later, and has, inside a block body, a sliding surface in a concave shape corresponding to the spherical body. In the present embodiment, the female joint part 72 fixed to the bracket 70 is provided as a fixed part, while the male joint part 68 having a spherical body is provided as a moved part so as to be angularly displaced.

Figure 4:
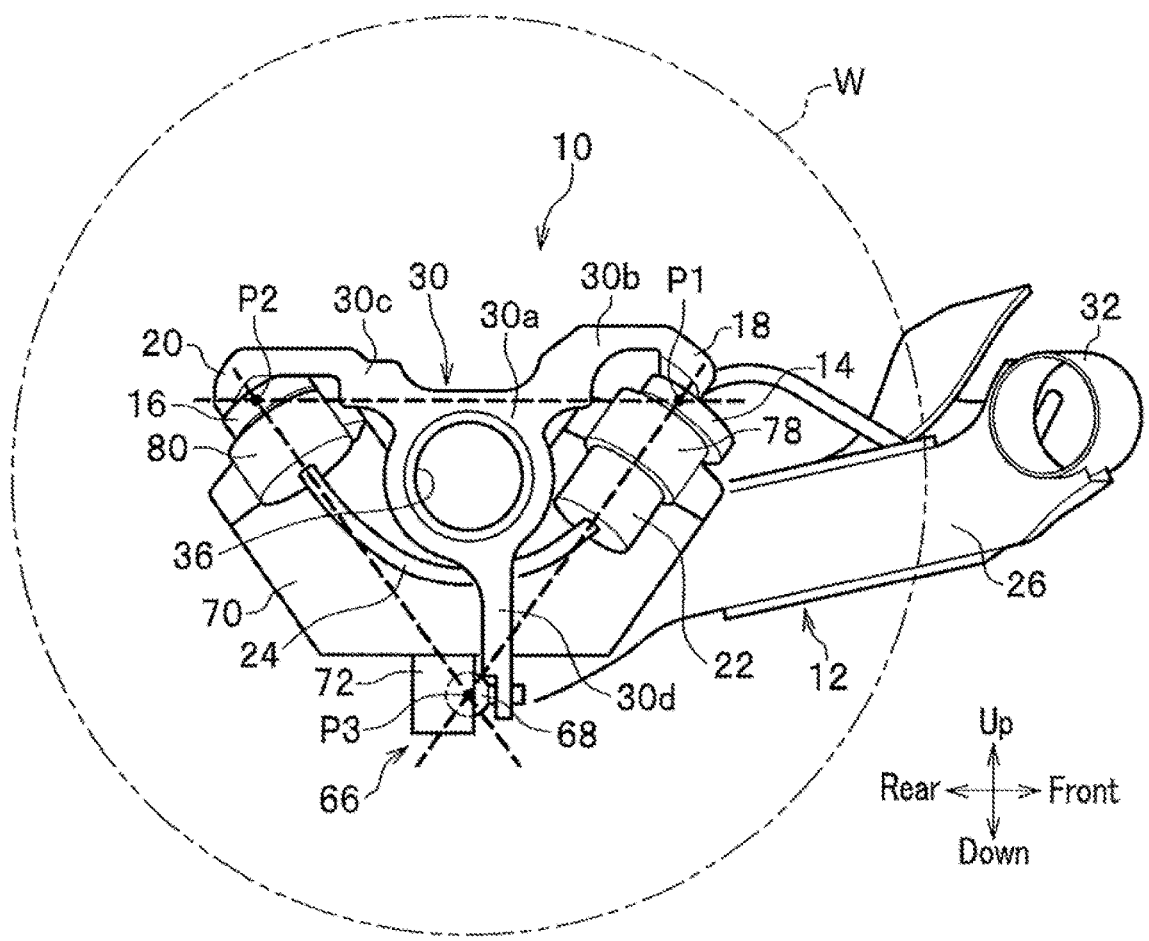
FIG. 4 is a side view of the rear suspension device, partially transparent, as viewed from the right rear wheel inward.

FIG. 4 is a side view of the rear suspension device, partially transparent, as viewed from the right rear wheel inward. The right rear wheel W is rotatably supported at three points (P1, P2, P3) of the first cam 14, the second cam 16, and the ball joint 66. Note that the first cam 14, the second cam 16, and the ball joint 66 are substantially equiangularly arranged along the circumferential direction, to have an advantage of requiring less power of the electric motor 22 to be described later.

Returning to FIG. 1, a bracket 70 in a plate shape is fixed to an outer side wall, facing the right rear wheel W, of the trailing arm 26. A cut-in portion 76 is formed in the center on a radially inner side of the bracket 70 so as to avoid interference with the joint 40 coupled to the axle 34.

The first cam 14, a first speed reducer 78, the single electric motor 22, and the first cam follower 18 are respectively arranged on the front portion in the vehicle front-rear direction of the bracket 70 (see FIG. 2) with respect to the cut-in portion 76 (see FIG. 1). On the other hand, the second cam 16, a second speed reducer 80, and the second cam follower 20 are respectively arranged on the rear portion in the vehicle front-rear direction of the bracket 70 (see FIG. 2) with respect to the cut-in portion 76 (see FIG. 1).

FIG. 3 is an enlarged plan view of the first cam (second cam). As shown in FIG. 3, the first cam 14 and the second cam 16 are both formed of cam plates having the same shape, and are each continuously formed with cam grooves 48 having the same cam groove shape but different diameters (a first cam groove 48a and a second cam groove 48b, to be described later). The cam plate has a composite shape, in a planar view, in which a semicircle having a large diameter and a semicircle having a small diameter are combined. A first rotation axle 82 and the second rotation axle 84, as respective rotation centers of the first cam 14 and the second cam 16, extend upward from the first cam 14 and the second cam 16. Note that the first cam groove 48a and the second cam groove 48b are collectively shown as a "cam groove 48" in FIGS. 1 and 2.

The cam groove 48 has the first cam groove 48a in a substantially semicircular shape having a small diameter continuously formed (configured) with the second cam groove 48b in a substantially semicircular shape having a large diameter. The cam groove 48 is provided so that the first and second engaging pins 44, 52 of the first and second cam followers 18, 20 each follow along the cam groove 48, when the first and second cams 14, 16 rotate about the first and second rotation axles 82, 84, respectively, in predetermined directions.

As shown in FIG. 2, the first speed reducer 78 and the electric motor 22 (for example, a DC motor with a brush) as a drive source are integrally coupled to the lower side of the first cam 14. The first speed reducer 78 reduces the rotation speed of the electric motor 22, and is composed of a planetary gear mechanism, a cycloid, and the like, for example. The first speed reducer 78 has the same configuration as the second speed reducer 80 for the second cam 16, and they are used with the first cam 14 and the second cam 16, respectively. The first cam 14 is rotationally driven by the electric motor 22 directly via the first speed reducer 78. Note that the second speed reducer 80 is integrally coupled to the second cam 16 on its lower side, but the electric motor 22 is not coupled to the second cam 16.

As shown in FIG. 2, the rotational driving force transmitter 24 is provided between the first speed reducer 78 for the first cam 14 and the second speed reducer 80 for the second cam 16, to transmit a rotational driving force (rotational torque) of the single electric motor 22 to the second cam 16. The rotational driving force transmitter 24 is made of a flexible tube, for example, to transmit the rotational driving force through a torque transmission wire or the like held in the flexible tube. Alternatively, a belt (timing belt), not shown, a shaft, or the like may be used, for example.

Another rotational driving force transmitter 24a is provided between the left rear wheel (not shown) and the right rear wheel W (in a recess, having a U-shaped cross section, of the torsion beam 28) (see FIG. 1), to transmit the rotational driving force of the electric motor 22. The rotational driving force of the single electric motor 22 is transmitted to the first cam 14 and the second cam 16 arranged at the left rear wheel (not shown) via another rotational driving force transmitter 24a extending from an upper surface of the first cam 14. Note that another rotational driving force transmitter 24a may be eliminated and the electric motor 22 may also be arranged at the left rear wheel.

The rear suspension device 10 according to the present embodiment is basically configured as described above, and its operation and advantageous effects will be described next.

Figure 5:
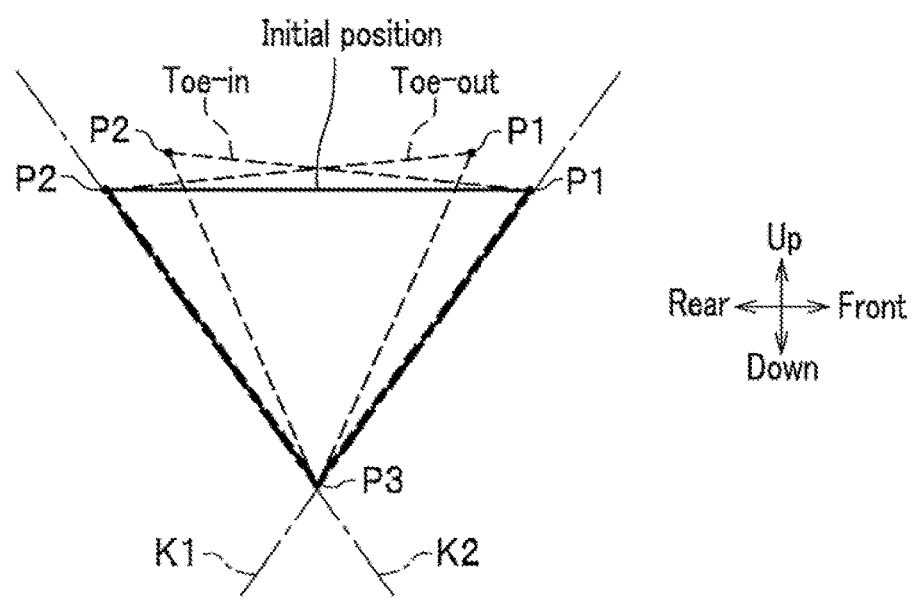
FIG. 5 is a schematic diagram of a steering axis, corresponding to those in FIG. 4, being set and displaced.

FIG. 5 is a schematic diagram of a steering axis, corresponding to those in FIG. 4, being set and displaced. In FIGS. 4 and 5, a point P1 indicates a contact point where the first engagement pin 44 of the first cam follower 18 contacts the cam groove 48 of the first cam 14. A point P2 indicates a contact point where the second engagement pin 52 of the second cam follower 20 contacts the cam groove 48 of the second cam 16. A point P3 indicates the rotation center (the center of the spherical body) of the ball joint 66 (see FIGS. 1 and 2).

In addition, a steering axis K1 in FIG. 5 indicates the steering axis at the position where the knuckle member 30 and the right rear wheel W has integrally been pivoted toward the toe-in direction at the maximum angle, to be represented as a straight line connecting the point P1 with the point P3. A steering axis K2 indicates the steering axis at the position where the knuckle member 30 and the right rear wheel W has integrally been pivoted toward the toe-out direction at the maximum angle, to be represented as a straight line connecting the point P2 with the point P3. Note that displacing from the initial position to the position of the steering axis K1 or K2 will be described later in detail.

Next, a description will be given of a case in which the electric motor 22 is rotationally driven and its rotational driving force is transmitted to the first cam 14 and the second cam 16 to pivot the right rear wheel W into a toe-in position.

FIGS. 6A to 6F are diagrams of related parts being each moved from an initial position to a toe-in position, where FIGS. 6A to 6C in the upper row are schematic plan views of the positional relationship between the cam groove and the engaging pin, and FIGS. 6D to 6F in the lower row are plan views of the right rear wheel W being pivoted, as viewed from above in the vehicle up-down direction.

FIGS. 7A to 7F are diagrams of related parts being moved from the initial position to a toe-out position, where FIGS. 7A to 7C in the upper row are schematic plan views of the positional relationship between the cam groove and the engagement pin, and FIGS. 7D to 7F in the lower row are plan views of the right rear wheel W being pivoted, as viewed from above in the vehicle up-down direction. Note that the first engagement pin 44 and the second engagement pin 52, each of which slidably displaces along the cam groove 48, are hatched in FIGS. 6A to 6C and FIGS. 7A to 7C in order to distinguish those from the first rotation axle 82 and the second rotation axle 84.

First, a description will be given of implementing a "toe-in" operation.

In the initial position shown in FIG. 6A, the first engaging pin 44 and the second engaging pin 52 are positioned in grooves, each formed with the first cam groove 48a and the second cam groove 48b. The first engagement pin 44 is positioned outside in the vehicle width direction with respect to the first rotation axle 82 of the first cam 14. The second engagement pin 52 is positioned outside in the vehicle width direction with respect to the second rotation axle 84 of the second cam 16. The right rear wheel W is in a parallel state along the vehicle front-rear direction. In this initial position, the electric motor 22 is rotationally driven to rotate the first cam 14 in the direction of an arrow A (counterclockwise) about the first rotation axle 82, and to rotate the second cam 16 in the direction of an arrow B (clockwise) about the second rotation axle 84. As shown in FIG. 6B, the first engagement pin 44 is in a substantially unmoved state held in the first cam groove 48a, while the second engagement pin 52 is displaced from the first cam groove 48a having a small diameter, along the second cam groove 48b having a large diameter. At this time, the second rotation axle 84 is guided along the slit 58 in the pair of guide rails 60. While the second rotation axle 84 is guided along the slit 58, the second engagement pin 52 is in a state that its degree of freedom in the front-rear direction is restrained to confine displacement in the front-rear direction.

When the first cam 14 is further rotated in the direction of the arrow A (counterclockwise) from the state in FIG. 6B and the second cam 16 is further rotated in the direction of the arrow B (clockwise), the second engagement pin 52 reaches a rotation end point of the second cam groove 48b to make a front portion of the right rear wheel W pivoted inward into a toe-in position (see FIG. 6C).

That is, the electric motor 22 is rotationally driven to transmit its rotational driving force directly to the first cam 14 and also via the rotational driving force transmitter 24 to the second cam 16. The transmitted rotational driving force rotates the first cam 14 and the second cam 16, in synchronization with each other, in the direction of the arrow A (counterclockwise) and the direction of arrow B (clockwise), respectively. The first and second engagement pins 44, 52 of the first and second cam followers 18, 20 follow along the respective cam grooves 48 of the rotating first and second cams 14, 16. This makes the knuckle member 30 and the right rear wheel W integrally pivoted toward a toe-in direction, that is, the front portion of the right rear wheel W being displaced inward into a toe-in position.

Next, a description will be given of implementing a "toe-out" operation.

In the initial position shown in FIG. 7A, the electric motor 22 is rotationally driven to rotate the first cam 14 in the direction of an arrow C (clockwise) about the first rotation axle 82, and to rotate the second cam 16 in the direction of an arrow D (counterclockwise) about the second rotation axle 84. As shown in FIG. 7B, the second engagement pin 52 remains held in the first cam groove 48a, while the first engagement pin 44 is displaced from the first cam groove 48a having a small diameter, along the second cam groove 48b having a large diameter.

When the first cam 14 is further rotated in the direction of the arrow C (clockwise) from the state in FIG. 7B and the second cam 16 is further rotated in the direction of the arrow D (counterclockwise), the first engagement pin 44 reaches a vicinity of an end point of the second cam groove 48b to make the front portion of the right rear wheel W pivoted outward into a toe-out position (see FIG. 7C).

That is, the rotational driving force transmitted from the electric motor 22 rotate the first cam 14 and the second cam 16, in synchronization with each other, in the direction of the arrow C (clockwise) and the direction of the arrow D (counterclockwise), respectively. The first and second engagement pins 44, 52 of the first and second followers 18, 20 follow along the respective cam grooves 48 of the first and second cams 14, 16. This makes the knuckle member 30 and the right rear wheel W integrally pivoted toward a toe-out direction, that is, the front portion of the right rear wheel W being displaced outward into a toe-out position.

Next, a description will be given of relations between the right rear wheel W being pivotally displaced from the initial position toward the toe-in or toe-out direction, and the steering axis.

Figure 10:
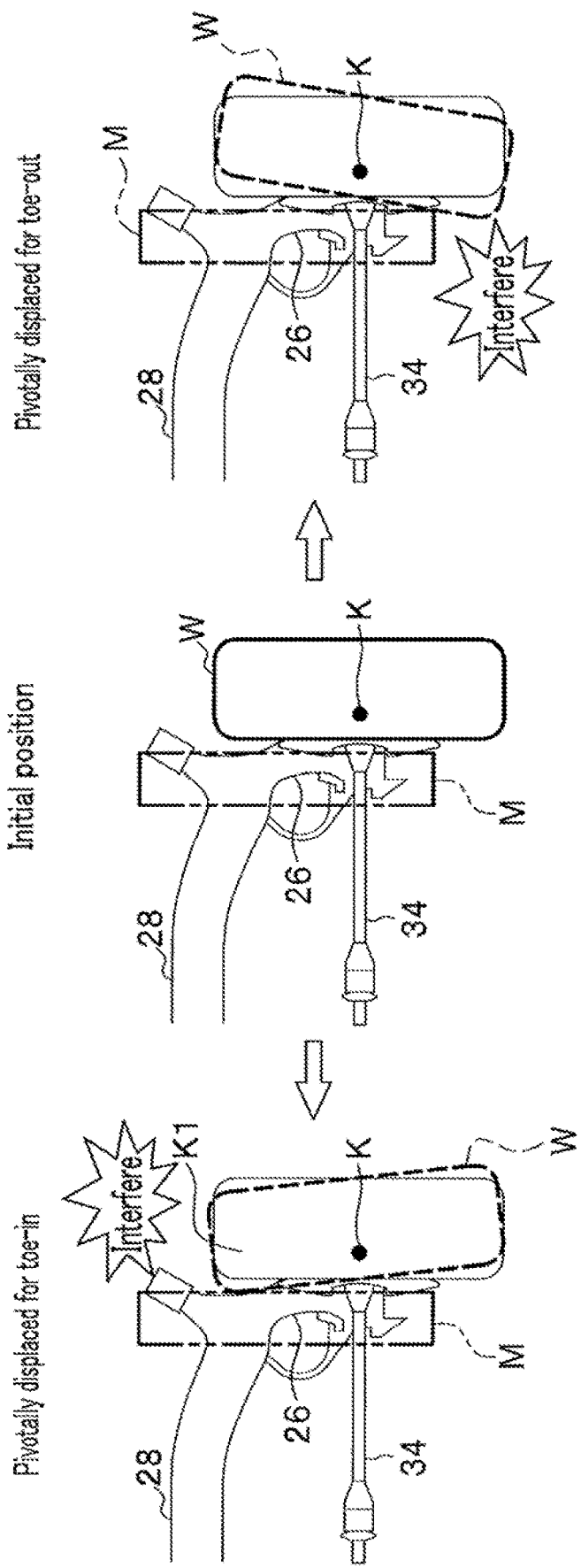
FIG. 10 is a plan view of a steering axis in a comparative example studied by the present applicant when a right rear wheel is pivoted from an initial position to a toe-in or toe-out position, as viewed from above in the vehicle up-down direction.

FIG. 8 is a plan view of the steering axis being displaced in the present embodiment when the right rear wheel is skewed from the initial position to the toe-in or toe-out position, as viewed from above in the vehicle up-down direction, while FIG. 10 is a plan view of a steering axis in a comparative example studied by the present applicant when a right rear wheel is skewed from an initial position to a toe-in or toe-out position, as viewed from above in the vehicle up-down direction.

The comparative example in FIG. 10 is common to the present embodiment only on the point that the H-type torsion beam mechanism is used. However, the comparative example is different from the present embodiment on the point that the knuckle member 30, the first cam 14 and the second cam 16, the first cam follower 18 and the second cam follower 20, the first engaging pin 44 and the second engaging pin 52, the electric motor 22, and the like are not provided.

In the comparative example studied by the present applicant, either in the case where the right rear wheel W is pivotally displaced from an initial position toward a toe-in direction or in the case where the right rear wheel W is pivotally displaced from the initial position toward a toe-out direction, a steering axis K is fixed at the same position as the initial position. In other words, in the comparative example, the right rear wheel W is only pivotally displaced inward, toward the toe-in direction, or outward, toward the toe-out direction, with the steering axis K at a predetermined position as a pivot point. Accordingly, in the comparative example, when the right rear wheel W is pivotally displaced toward the toe-in or toe-out direction, a front or rear portion of the right rear wheel W interferes with a vehicle body frame member or a chassis component (schematically represented by a rectangular broken line M in FIG. 10) (see states of the right rear wheel W being pivotally displaced for toe-in or toe-out in FIG. 10).

In contrast, in the present embodiment, as shown in FIG. 8, when the front portion of the right rear wheel W is displaced inward from the initial position to the toe-in position (maximum case), the steering axis K is displaced from the initial position frontward in the vehicle front-rear direction to the steering axis K1. Alternatively, when the front portion of the right rear wheel W is displaced outward from the initial position to the toe-out position (maximum case), the steering axis K is displaced from the initial position rearward in the vehicle front-rear direction to the steering axis K2.

In the present embodiment, the first cam 14 and the first cam follower 18 are arranged on a front side (one side) in the vehicle front-rear direction with respect to the axle 34, and the second cam 16 and the second cam follower 20 are arranged on a rear side (the other side) in the vehicle front-rear direction with respect to the axle 34. In the present embodiment, the first and second engaging pins 44, 52 of the first and second cam followers 18, 20 follow along the respective cam grooves 48 of the first and second cams 14, 16 which are rotated in the predetermined directions by the rotational driving force transmitted from the electric motor 22, Accordingly, in the present embodiment, when the right rear wheel W is pivotally displaced toward the toe-in direction, the steering axis K is pivoted about P3 as the center of the ball joint 66 frontward in the vehicle front-rear direction, as shown in FIG. 5 which schematically shows the steering axis K being set and displaced. As a result, in the present embodiment, the steering axis K is displaced from the initial position frontward in the vehicle front-rear direction to the toe-in steering axis K1. Note that P2 is displaced in a toe-in case from the initial position indicated by a solid line frontward in the vehicle front-rear direction as indicated by a broken line.

In contrast, when the right rear wheel W is pivotally displaced toward the toe-out direction, the steering axis K is pivoted about P3 as the center of the ball joint 66 rearward in the vehicle front-rear direction (see FIG. 5). As a result, in the present embodiment, the steering axis K is displaced from the initial position rearward in the vehicle front-rear direction to the toe-out steering axis K2. Note that P1 is displaced in a toe-out case from the initial position indicated by the solid line rearward in the vehicle front-rear direction as indicated by the broken line.

As described above, in the present embodiment, the steering axis K is displaced from substantially the center position (initial position) of the right rear wheel W to a forward position in the toe-in case, while the steering axis K is displaced from substantially the center position (initial position) of the right rear wheel W to a rear position in the toe-out case (see FIG. 8). This allows the present embodiment to have a simple structure to have less weight, to have less manufacturing costs, and to allow for increasing a cabin space.

Note that the engagement pins provided in the cam followers are configured to follow along the cam grooves 48 formed in the cams in the present embodiment, but the present invention is not limited thereto. For example, engaging pins (engaging parts) may be provided in the cams and cam grooves (guiding portions) may be formed in the cam followers so that said pins follow along said grooves.

In addition, in the present embodiment, the cam grooves 48 of the first and second cams 14, 16 are configured to have a composite shape in which the first cam groove 48a in a substantially semicircular shape having a small diameter continues to the second cam groove 48b in a substantially semicircular shape having a large diameter. Forming the cam grooves 48 of the first and second cams 14, 16 into such a composite shape allows, when steering is made toward the toe-in direction, for example, the first engaging pin 44 positioned on a relatively front side in the vehicle front-rear direction is held in the first cam groove 48a having a small diameter and remains substantially unmoved, and the second engaging pin 52 positioned on a relatively rear side in the vehicle front-rear direction is displaced to follow along the second cam groove 48b having a large diameter, to make the front portion of the right rear wheel W skewed inward. That is, the front upper arm 30b on the front side is made unmoved and only the rear upper arm 30c on the rear side is displaced outward in the vehicle width direction when steering is made toward the toe-in direction, to make the front portion of the right rear wheel W displaced inward. In this case, the first cam groove 48a having a small diameter functions as a "guide section in which the first cam follower remains unmoved" in one or more claims.

Further, in the present embodiment, the first cam 14 and the second cam 16 are synchronously rotated by the electric motor 22. Thus, the rotational driving force generated by the electric motor 22 is efficiently transmitted to the two, first and second, cams 14, 16. Additionally, using the single electric motor 22 requires no special synchronous control to easily synchronize the first cam 14 with the second cam 16. Note that the first cam 14 may not be synchronized with the second cam 16 in rotational driving so as to be controlled separately and independently.

Furthermore, "a torsion beam suspension mechanism" is used in the present embodiment as a suspension mechanism. The torsion beam suspension mechanism has generally the trailing arm 26 arranged close to the wheel, to have difficulty in securing a gap in the vehicle width direction between the trailing arm 26 and an inner side of the wheel. Accordingly, it is difficult to arrange an extension and retraction actuator within the gap space in the vehicle width direction between the inner side of the wheel and the trailing arm 26. For this issue, the present embodiment is configured to have a simple cam structure in which the first cam 14 and the first cam follower 18 are arranged on the front side in the vehicle front-rear direction with respect to the axle 34 and the second cam 16 and the second cam follower 20 are arranged on the rear side, to easily achieve the toe-in and toe-out control of the wheel.

Note that this torsion beam suspension mechanism also includes a multi link beam suspension mechanism in which a torsion beam is combined with a composite link including a lateral link and a control link.

FIGS. 9A to 9H illustrate variations of combining a suspension type, independent or non-independent control of right and left wheels, and a mounting position of an electric motor.

In FIG. 9, domain A on the left side shows various suspensions. As an example in domain A, FIG. 9A shows a five-link multi-suspension, FIG. 9B shows an E-type multi-link suspension, and FIG. 9C shows an H-type torsion beam suspension.

Domain B in the center of FIG. 9 shows whether the toe-in and toe-out control can be executed on the right and left wheels independently from each other (right and left wheels controlled independently, or right and left wheels controlled non-independently). In domain B, FIG. 9D shows a right-and-left-controlled-independently type in which toe-in control of right and left wheels can be independently executed, and FIG. 9E shows a four-wheel-steering (4WS) type in which toe in-control of right and left wheels is non-independently executed. Note that a term "ACT" in domain B indicated by a broken line shows that a cam-based actuator equipped with a motor is mounted at an in-wheel position, for example. In addition, the cam-based actuators (ACT) equipped with the motors and arranged on both the right and left wheels are connected with each other by the rotational driving force transmitter 24a in domain E.

In FIG. 9, domain C on the right side shows variations of a mounting position of the electric motor 22 (inclusive of electrical components and heavy objects). As an example in domain C, FIG. 9F shows one having the electric motor 22 mounted below springs, FIG. 9G shows one having the electric motor 22 mounted over springs and having the right and left wheels controlled independently, and FIG. 9H shows one having the electric motor 22 mounted over springs and having the right and left wheels controlled non-independently (4WS).

In the present embodiment, a double-cam mechanism, including the first and second cams 14, 16 and the first and second cam followers 18, 20, and the rotational driving force transmitters (torque transmission members) 24, 24a are combined to set variations of the suspension type (domain A), the independent or non-independent control of right and left wheels (domain B), and the mounting position of an electric motor (domain C). As a result, the present embodiment allows an appropriate combination to be selected, based on required vehicle performance (such as vehicle traveling performance and suspension performance) and manufacturing costs.

Note that the case has been described in the present embodiment, where the rear suspension device 10 is applied to a four-wheel drive vehicle, but the present invention is not limited thereto and may be applied to a front-wheel drive vehicle or a rear-wheel drive vehicle.

What is claimed is:
1. A wheel steering system comprising:
   a suspension mechanism inclusive of a knuckle for rotatably holding a wheel;

a first cam and a second cam that are rotatably supported with respect to the suspension mechanism;

a drive source that rotationally drives the first cam and the second cam;

a first cam follower that is provided on the knuckle and is adapted to follow the first cam;

a second cam follower that is provided on the knuckle and is adapted to follow the second cam;

a first guide portion provided in one of the first cam and the first cam follower, and a first engagement part provided in the other of the first cam and the first cam follower to engage with the first guide portion;

a second guide portion provided in one of the second cam and the second cam follower, and a second engagement part provided in the other of the second cam and the second cam follower to engage with the second guide portion; and a driving force transmitter that transmits a driving force of the drive source to the first cam and the second cam, wherein the first cam and the first cam follower are arranged on one side in a vehicle front-rear direction with respect to a wheel rotating shaft, the second cam and the second cam follower are arranged on the other side in the vehicle front-rear direction with respect to the wheel rotating shaft, and the first guide portion and the second guide portion each include a plurality of continuous circular arcs having different diameters from each other.

2. The wheel steering system according to claim 1, wherein the first guide portion and the second guide portion each have a guide section in which the first cam follower and/or the second cam follower remain or remains unmoved, when the first cam and the second cam are rotationally driven by the drive source.

3. The wheel steering system according to claim 2, wherein the first cam and the second cam are rotationally driven in synchronization with each other.

4. The wheel steering system according to claim 2, wherein the suspension mechanism is a torsion beam suspension mechanism.

5. The wheel steering system according to claim 3, wherein the suspension mechanism is a torsion beam suspension mechanism.

6. The wheel steering system according to claim 1, wherein the first cam and the second cam are rotationally driven in synchronization with each other.

7. The wheel steering system according to claim 1, wherein the suspension mechanism is a torsion beam suspension mechanism.

8. The wheel steering system according to claim 6, wherein the suspension mechanism is a torsion beam suspension mechanism.

* * * * *